(12) United States Patent
Mori

(10) Patent No.: US 7,409,560 B2
(45) Date of Patent: Aug. 5, 2008

(54) CERTIFICATION PROCESSING HARDWARE, CERTIFICATION PROCESSING SYSTEM AND USE MANAGEMENT HARDWARE

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 797 days.

(21) Appl. No.: 10/665,379

(22) Filed: Sep. 18, 2003

(65) Prior Publication Data

US 2004/0098582 A1    May 20, 2004

(30) Foreign Application Priority Data

Sep. 19, 2002  (JP) .............................. 2002-272794
Dec. 9, 2002   (JP) .............................. 2002-356515

(51) Int. Cl.
*H04L 9/32*    (2006.01)
*H04L 9/00*    (2006.01)

(52) U.S. Cl. .......................... 713/189; 713/168; 713/173

(58) Field of Classification Search ......... 713/168–170, 713/173, 175, 189, 190
See application file for complete search history.

(56) References Cited

U.S. PATENT DOCUMENTS 6,189,098 B1 *  2/2001  Kaliski, Jr. .................. 713/168

FOREIGN PATENT DOCUMENTS

| EP | 0715242 | 6/1996 |
|---|---|---|
| JP | 03-211932 | 9/1991 |
| JP | 03-290733 | 12/1991 |
| JP | 11-066008 | 3/1999 |
| JP | 2001-159925 | 6/2001 |
| JP | 2002-055961 | 2/2002 |
| JP | 2002-251326 | 9/2002 |
| WO | 9611545 | 4/1996 |
| WO | 9918544 | 4/1999 |
| WO | 0142888 | 6/2001 |

OTHER PUBLICATIONS

International Search Report for PCT/JP03/11719 mailed on Jan. 13, 2004.
Patent Abstracts of Japan for JP 03-290733 published on Dec. 20, 1991.

(Continued)

*Primary Examiner*—Hosuk Song
(74) *Attorney, Agent, or Firm*—Darby & Darby P.C.

(57) ABSTRACT

Certification processing hardware is connected to a game apparatus utilized for connecting with a game server in a network game environment to execute a user certification process. The certification processing hardware includes: a storing unit which stores certification information of the user, such as a user ID and a password; a certification information transmitting unit which encrypts the certification information with an encryption key from the game server to transmit it to the game server; a certification result information receiving unit which receives certification result information from the game server; and a certification result decryption processing unit which decrypts the certification result information. Components of the certification information cannot be referred to and copied from outside the certification processing hardware, thereby ensuring the confidentiality of the certification information. Security can be remarkably improved compared to a user certification method in which the user inputs the user ID and password by hand.

8 Claims, 6 Drawing Sheets

OTHER PUBLICATIONS

Patent Abstracts of Japan for JP 2001-159925 published on Jun. 12, 2001.

Patent Abstracts of Japan for JP 03-211932 published on Sep. 17, 1991.

Patent Abstracts of Japan for JP 11-066008 published on Mar. 9, 1999.

Patent Abstracts of Japan for JP 2002-055961 published on Feb. 20, 2002.

Patent Abstracts of Japan for JP 2002-251326 published on Sep. 6, 2002.

* cited by examiner

CERTIFICATION PROCESSING HARDWARE, CERTIFICATION PROCESSING SYSTEM AND USE MANAGEMENT HARDWARE

BACKGROUND OF THE INVENTION

1. Field of the Invention

The present invention relates to a security control technique including user certification and use period management in a network game.

2. Description of Related Art

Recently, a user can access a game server via the Internet with a terminal device such as a household game apparatus to enjoy various games by utilizing a network. Such a game environment is called a "network game environment" in a wide sense. There are various ways in which the user utilizes the network in practice.

The first method is that the user plays the game on-line. Namely, with keeping the game apparatus connected to the game server, the user communicates data for game processing with the game server and plays the game. In this manner, normally, whenever the user accesses the game server to start the game, a user certification process is needed. Namely, it is checked whether the user accessing the game server is a registered user who has completed a user registration or not, and whether the user actually accessing the game server is a real registered user or not. Such a user certification is generally executed in such a way that the user inputs a user ID and a password, which are generally issued during the user registration, to the game apparatus to transmit them to the game server. The game server checks whether the user ID and the password which are received are those of the registered user, and executes the user certification.

On the other hand, in the second method, the user does not play the game on-line, but utilizes the network as a distribution means of a game program. That is, the user accesses the game server via the network and selects a desired game to download a program of the desired game into his or her game apparatus. Once the downloading has been completed, as a rule, the user does not have to access the game server in order to play the game because the game program itself is already in the game apparatus of the user.

There are some problems in the game which utilizes the network. One of the problems is the user certification. As described above, in the first manner, the user certification is generally executed by a combination of the user ID and the password. However, in view of security, a user certification process which utilizes the user ID and the password is very weak for the following reasons.

First of all, it is easy for a third person to copy and falsify the user ID and the password. The user ID and the password are mere character strings. Besides, since the user ID and the password are determined on the assumption that the user inputs them to the game apparatus by hand, those lengths are usually 10 letters at most. Thus, if the third person unfairly pretending to be the registered user guesses and inputs various character strings to play the games, he or she can relatively easily guess the user ID and the password of others. Additionally, once known to the third person, the user ID and the password are in danger of being rapidly spread out to others. Since plural persons can use the single user ID and the single password at the same time, anyone can use the user ID and the password to unfairly play the game if the user ID and the password are spread out.

If the number of the letters of the user ID and the password is increased, it becomes difficult to guess them. However, since the user generally has to memorize and input the user ID and the password by hand, input errors and password loss (forgetting it) can easily happen if the user ID and the password are long. After all, such a long user ID and password cannot be used in practice, and there naturally exists a limit of the security.

Further, it is possible that the third person unfairly plays the game by intercepting and obtaining the user ID and the password which the user transmits from the game apparatus to the game server during communicating on the network and by transmitting false certification result information as if he or she succeeded in the user certification to the game apparatus by preparing and using a dummy certification server.

On the other hand, as in the second method, the use period management of the game to the user may be a problem when the network is utilized as the distribution means of the game program. The game program which the user downloads is usually not free, and a system which permits playing the game in a predetermined period (including an indefinite period) on condition that the user pays a necessary fee is common. In that case, one of the methods for managing an expiry date is, first of all, that the user is obliged to access the game server and perform the certification process before playing the game. As soon as the game server is accessed by the user, the game server checks the expiry date for the user to play the game. Before the expiry date, the game server transmits information to permit playing the game to the game apparatus. As a result, the user can play the game.

However, it is troublesome for the user to access the game server whenever he or she starts the game, and it costs money to communicate the data. Therefore, it is desirable that the user does not have to access the game server after paying the fee, and a use expiry date is managed only by the game apparatus side.

SUMMARY OF THE INVENTION

The present invention has been achieved in order to solve the above problems. It is an object of this invention to enable that the user certification and the use period management are surely executed without requiring a complicated process for the user and that the user can play the game safely and comfortably in the game utilizing a network.

According to one aspect of the present invention, there is provided a certification processing hardware which is connected to a terminal device capable of communicating with a server device via a network and executes a user certification process in the terminal device by communicating with the server device including: a storing unit which stores certification information of the user; an encryption key receiving unit which requests a certification process to the server device and receives an encryption key assigned to the hardware for the certification process from the server device; an encryption processing unit which encrypts the certification information by using the received encryption key; a certification information transmitting unit which transmits the encrypted certification information to the server device; a certification result information receiving unit which receives encrypted certification result information from the server device; a decryption processing unit which decrypts the encrypted certification result information by using the encryption key; and an execution permitting unit which gives an execution permission of a process including communication with the server device to the terminal device when decryption of the certification result information is successfully completed by the decryption processing unit.

The hardware is provided in the terminal device, and executes the certification process of a user who uses the terminal device. The terminal device is capable of communicating with the server device via the network, and includes the game apparatus which is used for accessing the game server in the network game environment. The hardware has the storing unit which stores the certification information of the user. For example, the certification information may include the user ID and the password. The certification information is stored inside the hardware, and the hardware is formed so that the access from outside to the information stored inside is impossible.

This can be realized by omitting an input/output unit from outside, other than the input/output unit from outside such as a connector for connection with the terminal device. Therefore, since the information in the hardware cannot be referred to and copied from outside of the hardware, the confidentiality of the certification information can be ensured.

The encryption key receiving unit requests the certification process to the server device and receives the encryption key from the server device. The encryption processing unit encrypts the certification information by using the encryption key, and the transmitting unit transmits the encrypted certification information to the server device. By encrypting and transmitting the certification information, it is possible to prevent unfair utilization, such as obtaining and copying the certification information, during transmission on the network. The server device encrypts the certification result information corresponding to the certification information transmitted in that way, and transmits it to the hardware. The receiving unit receives the encrypted certification result information, and the decryption processing unit decrypts it by using the encryption key to obtain the certification result information. Since the certification result information transmitted from the server device is also encrypted, it can be prevented that the certification result information is unfairly obtained on the network and abused. Thereafter, if the decryption of the certification result information succeeds, execution permission is given to the terminal device. Accordingly, the terminal device can execute the process including communication with the server device.

It is noted that the encryption processing unit, the transmitting unit, the receiving unit and the decryption processing unit can be formed as an integrated circuit. Thereby, it is impossible to acquire information and functions inside the hardware from outside, so falsification and copy of the hardware itself can be prevented.

The storing unit can be formed to be removable. Thereby, when another portion of the hardware has to be exchanged due to trouble or other reason, the storing unit which stores the certification information does not have to be exchanged, and can be continuously used. Thus, the storing unit is able to cope with the exchange and upgrade of the hardware without changing the certification information.

According to one feature of the above certification processing hardware, the decryption processing unit may execute the decryption process which uses one encryption key only once. Thereby, even though the encrypted certification result information which is transmitted from the server device is obtained on the network and is transmitted to the terminal device by using the dummy certification server, the decryption of the certification result information cannot be successfully executed because the encryption key corresponding to the encrypted certification result information has already been used once. Therefore, the unfair certification process which uses the dummy certification server can be prevented.

According to another feature, the above certification processing hardware may further include a controller which controls the terminal device based on the decrypted certification result information. Thereby, the terminal device can be operated according to the certification result.

According to another aspect of the present invention, there is provided a certification processing system including a server device and a terminal device which can communicate with each other via a network, and a certification processing hardware which is connected to the terminal device and executes the user certification process in the terminal device by communicating with the server device. The server device includes an encryption key transmitting unit which transmits an encryption key assigned to the hardware which is making a certification request in response to the certification request from the hardware, and a certification result information transmitting unit which receives and decrypts the encrypted certification information from the hardware and encrypts the certification result information to transmit it to the hardware. The hardware includes: a storing unit which stores the certification information of the user; an encryption key receiving unit which requests a certification process to the server device and receives the encryption key from the server device; an encryption processing unit which encrypts the certification information by utilizing the received encryption key; a certification information transmitting unit which transmits the encrypted certification information to the server device; a certification result information receiving unit which receives the encrypted certification result information from the server device; a decryption processing unit which decrypts the encrypted certification result information by using the encryption key; and an execution permitting unit which gives execution permission of a process including communication with the server device to the terminal device when decryption of the certification result information by the decryption processing unit succeeds. The terminal device includes a permission requesting unit which requests execution permission of the process including the communication with the server device to the hardware; and an executing unit which executes the process after receiving the execution permission from the hardware.

According to the above certification processing system, the hardware connected to the terminal device executes the user certification process of the user. The terminal device is able to communicate with the server device via the network, and includes the game apparatus used for accessing the game server in the network game environment. The hardware has the storing unit which stores the certification information of the user. The certification information may include the user ID, the password and the like. The certification information is stored inside the hardware. The hardware is formed so that information stored inside cannot be accessed from outside. This can be realized by omitting the input/output unit from outside, other than the input/output unit from outside such as a connector for connection with the terminal device. Therefore, since the information inside of the hardware cannot be referred to and copied from outside of the hardware, the confidentiality of the certification information can be ensured.

The encryption key receiving unit requests the certification process to the server device and receives the encryption key from the server device. The encryption processing unit encrypts the certification information by using the encryption key, and the transmitting unit transmits the encrypted certification information to the server device. If the certification information is encrypted to transmit, the unfair utilization, e.g., obtaining and copying the certification information during transmitting on the network, can be prevented. The server device encrypts the certification result information corresponding to the certification information transmitted in that way, and transmits it to the hardware. The receiving unit receives the encrypted certification result information, and the decryption processing unit decrypts by using the encryption key, and obtains the certification result information. Since the certification result information which is transmitted from the server device is also encrypted, it can be prevented that the certification result information is unfairly obtained and abused on the network. Thereafter, if the decryption of the certification result information succeeds, the execution permission is given to the terminal device.

Accordingly, the terminal device can execute the process including communication with the server device.

According to another aspect of the present invention, there is provided a use management hardware, which is connected to the terminal device and which executes managing process of availability or unavailability of the terminal device, including: a storing unit which stores availability information indicating the availability or unavailability of the terminal device; a receiving unit which receives an operation request from the terminal device; a determining unit which determines the availability or unavailability of the terminal device based on the availability information; and a controller which enables the terminal device to operate when the determining unit determines that the terminal device is available.

The use management hardware executes management of the availability or unavailability of the terminal device. In the storing unit, the availability information of the terminal device is stored. If the operation request is sent from the terminal device, the use management hardware determines whether the terminal device is available or not, based on the availability information. The availability information may be time-based information of the terminal device such as a use expiry date, available days and available hours, or may be point information such as a prepaid-type count value. Further, the availability information may be information based on a special contract or authority for using the terminal device. It is noted that the availability information includes various information which can be used for determining the availability or unavailability of the terminal device with those examples. For example, when the availability or unavailability is prescribed by the use expiry date and the total available hours, the determining unit can be formed by a clock function. When the availability or unavailability is prescribed by the prepaid-type count value, the determining unit can be formed by a counter function. The controller permits the operation of the terminal device when the determining unit determines to be available. Thereby, it becomes easy to manage the availability or unavailability of the terminal device.

It is noted that the receiving unit, the determining unit and the controller can be formed as the integrated circuit. Thereby, it is impossible to acquire the inside information and functions of the hardware from outside, and it can be prevented that the hardware itself is falsified and copied.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE PREFERRED EMBODIMENTS

The preferred embodiments of the present invention will now be described below with reference to the attached drawings.

(1) Network Game Environment

Figure 1:
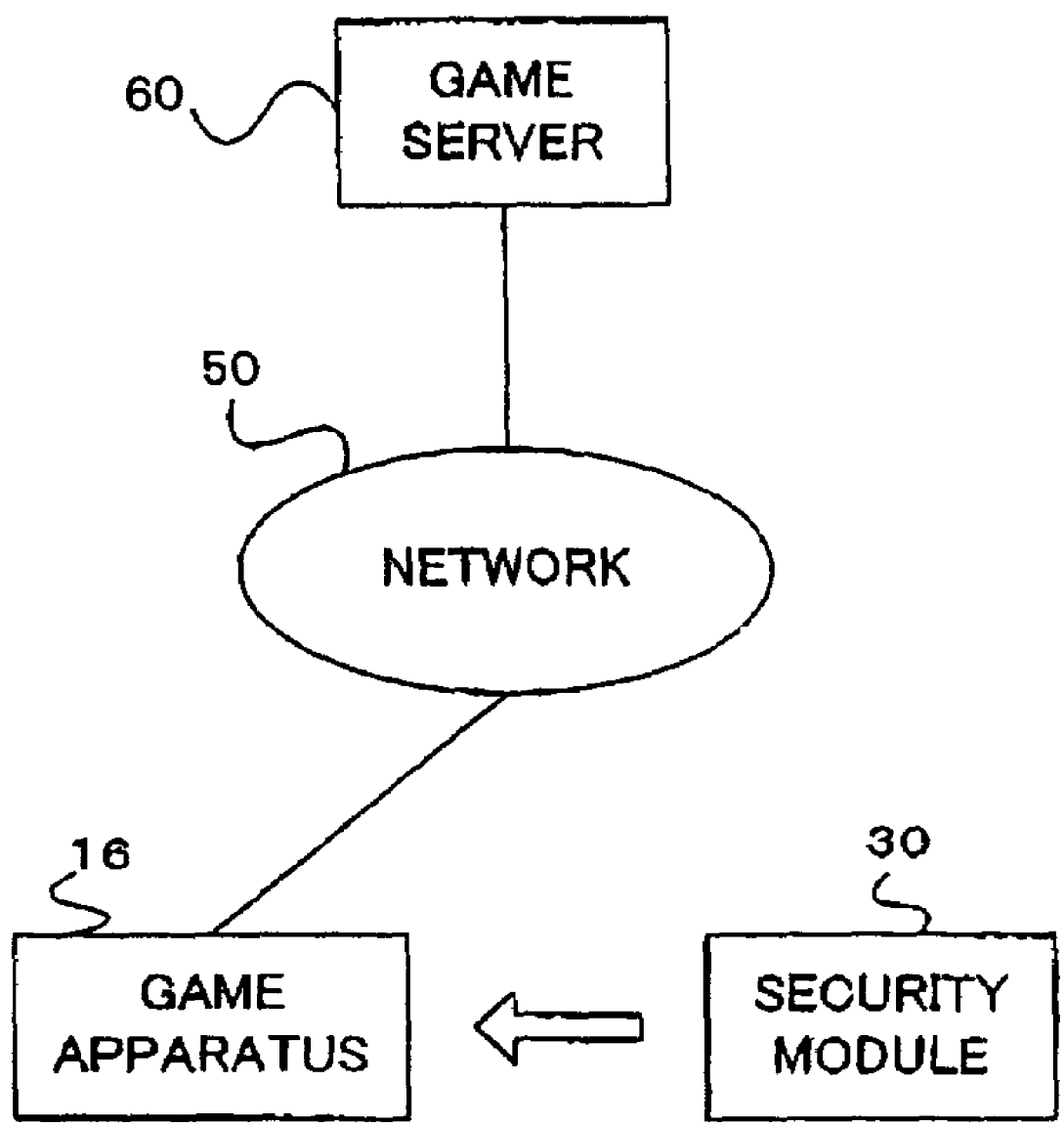
FIG. 1 is a block diagram showing a schematic structure of a network game environment according to an embodiment of the present invention.

FIG. 1 shows a schematic configuration of the network game environment according to an embodiment of the invention. In FIG. 1, the game server 60 which a supplier of the game manages and the game apparatus 16 which the user uses are formed to communicate with each other via the network 50. Though one of preferred examples of the network 50 is the Internet, the network may be other than the Internet. When the network 50 is the Internet, an Internet service provider (ISP) and the like exists between the game apparatus 16 of the user and the network 50. Those explanations are omitted here.

Though the game apparatus 16 is preferably the household game apparatus of the user, it may be a business-use game apparatus which is used for amusement. In FIG. 1, only the single game apparatus 16 is shown for ease of explanation. In practice, many game apparatuses 16 of many users are similarly formed to communicate with the game server 60 via the network 50.

The game server 60 supplies the game to the user via the network 50. One method of supplying the game is, as described above, that the user plays the game on-line by communicating between the game apparatus 16 and the game server 60. In that case, each user may play the game one-to-one with the game server 60, or a plurality of users may handle the game apparatuses 16 respectively, under the control of the game server 60, to play the same game together at the same time. In both cases, the user has to access the game server 60 to start the game and execute the user certification process.

On the other hand, in the second method described above, the user utilizes the network simply as the distribution means and downloads the preferred game program from the game server 60. Since the game program is usually not free, the user pays the necessary fee for the game program to a company managing the game server 60 in some way. On paying the fee for the game program, the user obtains a right to use the game during a predetermined period. On the condition that the user pays the fee for the game program, the game server 60 permits the user to download the game program to the game apparatus 16 of the user via the network 50. Thereafter, the user can use the downloaded game program freely within the right to use the game program corresponding to the fee for the game program which the user paid, i.e., within the predetermined period. Therefore, the supplier of the game who manages the game server 60 has to take a measure to inhibit the user from using the program after the use expiry date. Hereafter the process is called "use expiry date management."

As shown in FIG. 1, a security module 30 is used in the network game environment according to the present invention. The security module 30, which is connected to the game apparatus 16 in use, is a dedicated module used for executing the user certification and the use expiry date management. Physically, the security module 30 is a hardware device whose internal configuration thereof is unknown to the user, and is attached to the predetermined connector of the game apparatus 16. The game apparatus 16 is designed such that it cannot execute the network game utilizing the game server 60 if the security module 30 is not attached to the game apparatus 16. In using game software which is on sale and unrelated to the game server 60, the game apparatus 16 can operate without the security module 30. In the present invention, the user certification process and the use expiry date management can be easily and securely executed by using the security module 30.

(2) Configuration of Game Apparatus

Figure 2:
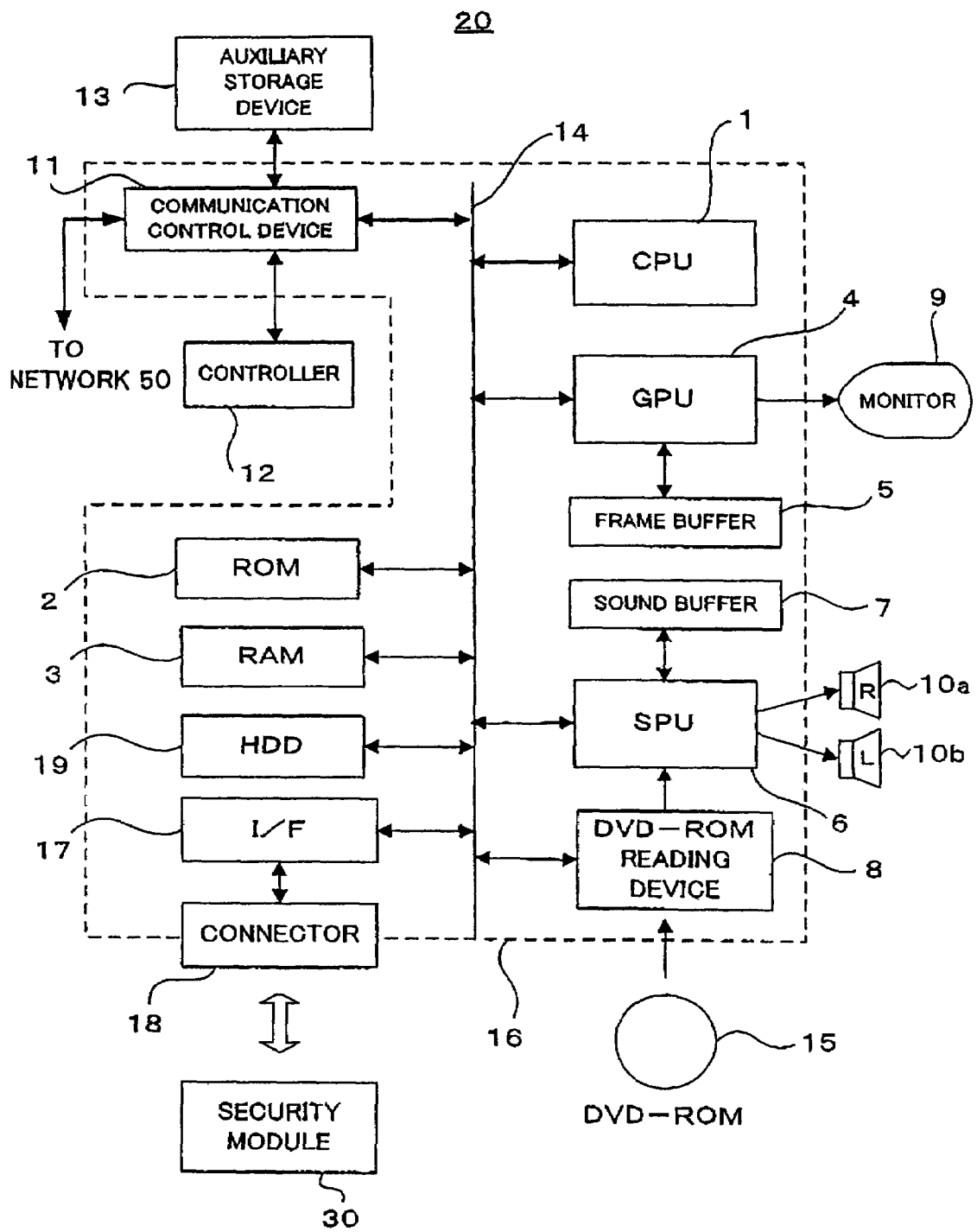
FIG. 2 is a block diagram showing a schematic configuration of a game apparatus according to an embodiment of the present invention.

Next, the configuration of the game apparatus shown in FIG. 1 will be explained. FIG. 2 is a block diagram of the game system 20 including the game apparatus 16.

This game system 20 includes a monitor 9, speakers 10a and 10b, a controller 12, an auxiliary storage device 13, a DVD-ROM 15, and the game apparatus 16. Generally, a household TV set is utilized as the monitor 9, and speakers integrated in the TV set are utilized as the speakers 10a and 10b. The speakers have two channels which are the speakers for a right channel and a left channel. The controller 12 operates as an input device, and there are provided operating members which receive the operation by a player. The auxiliary storage device 13 is a storage medium for storing data related to the progress of the game, and a semiconductor memory can be utilized, for example.

The game apparatus 16 has a CPU 1 formed mainly of a microprocessor, a ROM 2 and a RAM 3 as main storing apparatuses for the CPU 1, a graphic-processing unit (GPU) 4 for an image processing and a sound-processing-unit (SPU) 6 for sound processing, frame and sound buffers 5 and 7 for those units, a DVD-ROM reading device 8, an interface (I/F) 17, a connector 18, and a hard disc (HDD) 19.

An operating system serving as a necessary program for operation control of the game apparatus is stored in the ROM 2. The program and data for the game, which are read out from the DVD-ROM 15 serving as the storage medium, are written into the RAM 3 as the need arises.

The GPU 4 receives image data from the CPU 1 and draws a game screen on the frame buffer 5. At the same time, the GPU 4 converts the drawn image data into a predetermined video reproducing signal and outputs it to the monitor 9 at predetermined timings. The SPU 6 reproduces game-sound data, such as voices and musical sound, which are read out from the DVD-ROM 15 and recorded in the sound buffer 7, and outputs them from the speakers 10a and 10b.

The DVD-ROM reading device 8 reads out the program and data recorded on the DVD-ROM 15 according to an instruction from the CPU 1, and outputs a signal corresponding to the component thus read out. The HDD 19 stores the game program downloaded from the game server 60.

The connector 18, which is used in attaching the security module 30 to the game apparatus 16, is connected with the connector 40 on the side of the security module 30. The connector 18 is connected with the bus 14 via the interface 17.

A communication control device 11 is connected with the CPU 1 via the bus 14, and the controller 12 and the auxiliary storage device 13 are connected with the communication control device 11 in a removable manner. The communication control device 11 scans an operation condition of the operating members of the controller 12 at the predetermined period such as 1/60 second, and outputs the signal corresponding to the scan result to the CPU 1. Based on the signal, the CPU 1 determines the operation condition of the controller 12. The communication control device 11 operates for the sake of necessary communication with the game server 60 via the network 50.

The game apparatus 16 can execute a predetermined game according to the game program recorded on the DVD-ROM 15 as the storage medium. When the network 50 is utilized as a download means of the game program, the game program downloaded from the game server 60 is stored in the HDD 19 inside the game apparatus 16. Therefore, the game apparatus 16 can execute the game according to the game program which is download from the game server 60 and stored in the HDD 19, instead of the game program recorded in the DVD-ROM 15.

In executing the network game, the CPU 1 executes the game program which is recorded in the DVD-ROM 15 or which is downloaded from the game server 60. During the game play by the user, playing situation data of the user generated in the game apparatus 16 is transmitted to the game server 60 via the communication control device 11 and the network 50. If necessary, the game apparatus 16 receives game situation data generated by the game server 60 and the playing situation data of another user playing the game on the network 50 at the same time from the game server 60. In that way, the game apparatus 16 can be used for on-line games.

(3) Security Module

Figure 3:
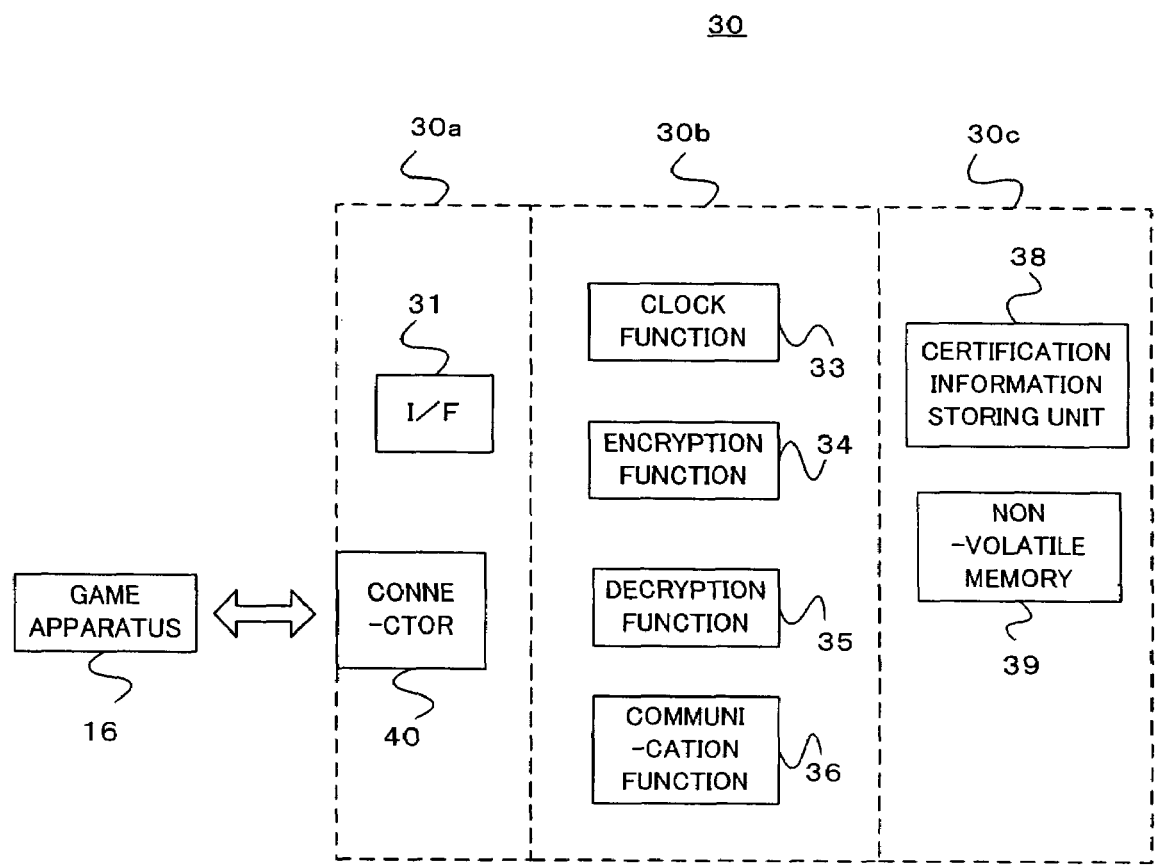
FIG. 3 is a function block diagram showing an internal configuration of a security module according to an embodiment of the present invention.

Next, the security module will be explained in detail. FIG. 3 shows a schematic configuration of the security module 30. As shown in FIG. 3, the security module 30 roughly has an interface (I/F) unit 30a, a processing unit 30b and a storing unit 30c. Each unit in the security module 30 is formed as a hardware unit including a memory, a flash memory and integrated circuits so that the information stored inside cannot be accessed from outside. This can be realized by omitting the input/output unit and input/output terminal connected to outside, other than the input/output unit to the game apparatus, such as the connector 40 for connection with the game apparatus 16.

The I/F unit 30a, which is the unit for connecting with the game apparatus 16, includes an interface (I/F) 31 and the connector 40. The connector 40 is connected with the connector 18 in the game apparatus 16 shown in FIG. 2. The I/F 31 executes an interface processing between the data in the security module 30 and the data of the game apparatus 16.

The storing unit 30c includes a certification information storing unit 38 and a non-volatile memory 39. The certification information storing unit 38 stores the certification information such as the user ID and the password. On the other hand, the non-volatile memory 39 stores various kinds of information other than the certification information. Specifically, when the user downloads a specific pay game program, the non-volatile memory 39 stores the use expiry date information thereof. The use expiry date information may be stored as an ending date such as the year, month and date, or as remaining hours such as the number of remaining hours.

The processing unit 30b, which is formed by a CPU, includes a clock function 33, an encryption function 34, a decryption function 35 and a communication function 36. When the CPU executes each prepared program, each function is achieved. The clock function 33 is an internal clock of the security module 30, and the function is basically formed not to be adjusted from outside.

The encryption function 34 executes the encryption process of the certification information such as the user ID and the password stored in the certification information storing unit 38 by using a predetermined encryption key during the user certification process. The encrypted certification information is transmitted to the game server 60 in the user certification process. The decryption function 35 decrypts the encrypted information transmitted from the game server 60. The communication function 36 executes a communication process of the encrypted user certification information and the information transmitted from the game server 60.

(4) User Certification Process

Next, the user certification process will be explained. The user certification process is executed when the user connects with the game server 60 from the game system 20 to start the network game. The user certification process determines whether or not the user is the registered user who is permitted to play the game.

Normally, in the user certification process, the user inputs the certification information such as the user ID and the password to the game system 20, and the input certification information is transmitted to the game server 60 via the network 50. On the contrary, according to the present invention, the certification information such as the user ID and the password is stored inside the certification information storing unit 38 in the security unit 30 in order not to be accessed from outside. Namely, since the certification information is held in the security module 30 in the form of the hardware, it is difficult to copy. Moreover, it is also difficult to take out the stored certification information from the security module 30 to the outside. Even though the user does not know the certification information stored in practice, the user can play the game if he or she has the security module 30. Therefore, exposure or an unfair distribution of the certification information can be prevented. Even if a third person successfully obtains the certification information, he or she has no way to input the certification information during the user certification process. Also, plural users cannot use the security module 30 at the same time because there physically exists only one security module 30. Further, security can be improved much more because the user ID and the password are never input incorrectly and a much longer user ID and password can be utilized, compared to when the user inputs the user ID and the password by hand.

Next, the user certification process executed between the security module 30 and the game server 60 will be explained. The data which is input and output from the security module 30 is, first of all, input for the game apparatus 16 only to pass, i.e., the game apparatus 16 does not execute any particular process to the data. Namely, the user certification process is executed substantially between the security module 30 and the game server 60.

In the user certification process, it is required that the certification information of the user stored in the security module 30, such as the user ID and the password, is transmitted correctly to the game server 60 via the network 50. At that time, the third person must be prevented from unfairly intercepting the transmitted data on the network and obtaining the certification information. So, according to the embodiment of the present invention, the security module 30 transmits the certification information to the game server 60 after it is encrypted by the encryption function 34. Thereby, a third person is prevented from obtaining the transmitted data on the network 50 and analyzing the certification information from the data.

When the user certification for the registered user has been completed on the game server 60 correctly, the game server 60 transmits the notification, i.e., the permission information which permits the execution of the game by the game apparatus 16 of the user, to the security module 30. When obtaining the permission information, the security module 30 controls the game apparatus 16 to enable the execution of the game. The game server 60 also encrypts and transmits the permission information.

On the other hand, when the game use period of the user is over, even though the user executes the user certification to the game server 60 in the same process as before, the user certification fails because the game server 60 recognizes that the game use period of the user is over.

In such a case, it can happen that the user obtains the permission information which is transmitted from the game server 60 to the security module 30 via the network 50 when the user certification process is executed correctly before the game use period is over, and prepares a dummy server, which operates as the false game server, after the game use period is over so that the same permission information is transmitted from the dummy server to the game apparatus 16 of the user. In that case, the game apparatus 16 may mistake the permission information from the dummy server for the permission information from the game server 60 and execute the game.

According to the embodiment of the present invention, it is determined that the encrypted permission information transmitted from the game server 60 to the security module 30 is regarded valid only once in order to prevent such a false user certification. Namely, it is determined that a single permission information is valid on the security module 30 only once. This can be realized by storing a record of the permission information which is received from the game server 60 in the past and invalidating the identical permission information, which is received again, with the permission information utilized in the past to inhibit executing the game.

Instead of making the permission information valid only once, the key to encrypt the permission information can be made valid only once. Namely, the game server 60 encrypts the permission information by using a specific encryption key, and transmits it to the security module 30. The security module 30 obtains the encryption key from the game server 60, and decrypts the permission information by using the encryption key to execute the game. The security module 30 is designed such that the encryption key once used in the past cannot be used again in the decryption process of the permission information thereafter. As a result, when the permission information encrypted with the encryption key already used in the past is transmitted from the dummy server to the game apparatus 16 again to unfairly execute the game, the security module 30 is unable to obtain the permission information because there is a record indicating that the encryption key has already been used in the past and cannot be used again. In that way, the unfair game execution after the use expiry date can be prevented.

Figure 4:
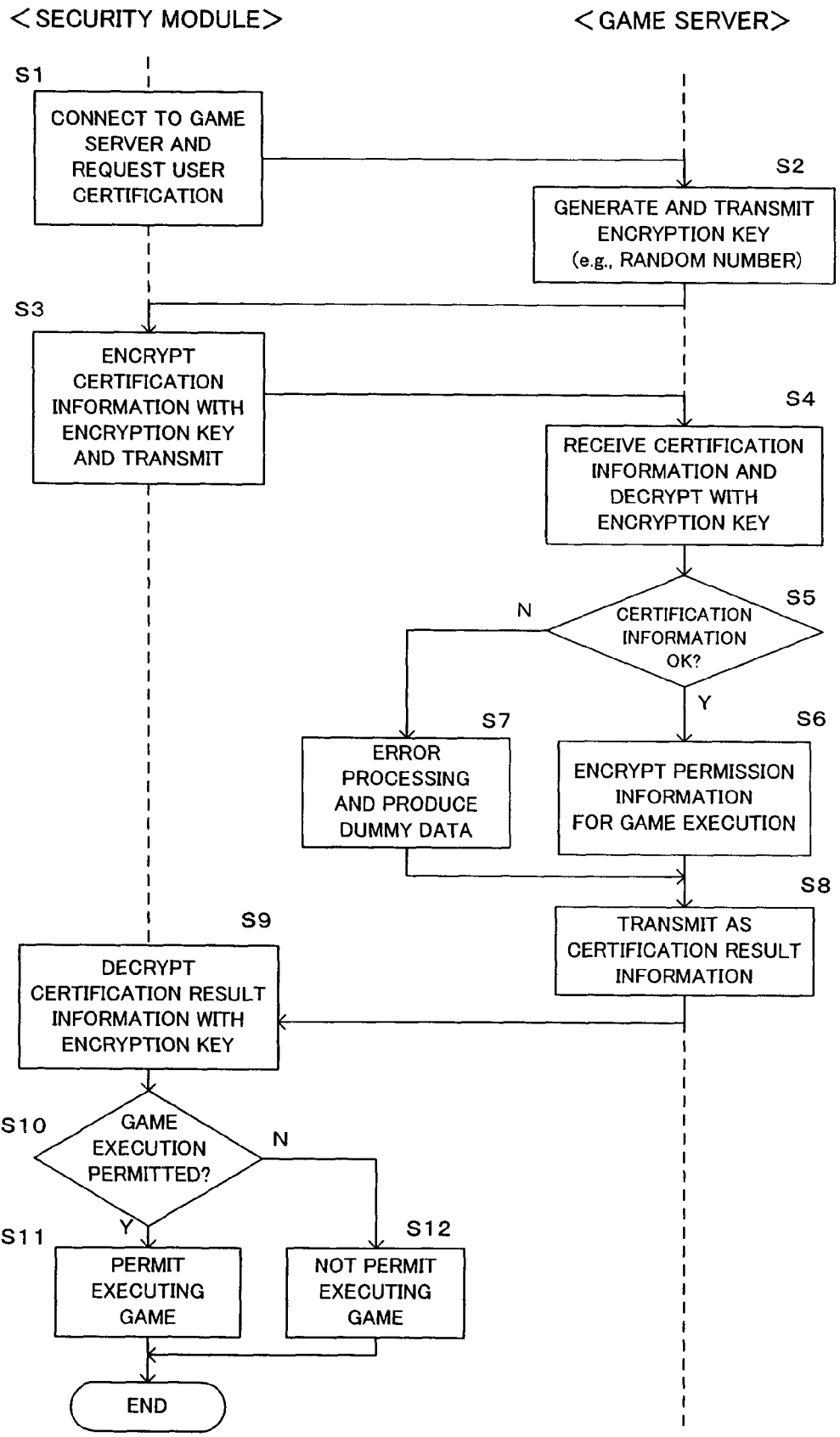
FIG. 4 is a flow chart of a user certification process according to an embodiment of the present invention.

Next, the specific example of the user certification process will be explained with reference to FIG. 4. FIG. 4 is a flow chart of the user certification process. First of all, the security module 30, which is connected with the game server 60, requests to execute the user certification (step S1). In response to that, the game server 60 produces a predetermined encryption key and transmits it to the security module 30 (step S2). The encryption key is used for encrypting and decrypting the certification information and the permission information in transmitting and receiving the certification information and the permission information between the security module 30 and the game server 60, and it may be a random number, for example.

On receiving the encryption key, the security module 30 obtains the certification information from the certification information storing unit 38, and encrypts the certification information with the encryption key. In that way, the security module 30 produces the encrypted certification information and transmits it to the game server 60 (step S3). The certification information includes the user ID, the password and the like. The game server 60 receives the encrypted certification information and decrypts it by using the encryption key to obtain the certification information (step S4). Then, the game server 60 determines whether the certification information is of a registered user or not (step S5). The step of determining whether the received certification information is of the properly registered user or not is executed by referring to a database storing the user information about the registered user.

When the certification information is of the properly registered user (step S5; Yes), the game server 60 generates the game execution permission information, and encrypts it with the encryption key to produce the encrypted permission information (step S6). On the contrary, when the certification information is not of properly registered user (step S5; No), the game server 60 executes a predetermined error process and produces the dummy data (step S7). The dummy data is produced so that an analysis of the data for unfair purpose is prevented, so the dummy data can be completely meaningless data. The game server 60 transmits the encrypted permission information produced in the step S6 or the dummy data produced in the step S7 to the security module 30 as the certification result information (step S8).

On receiving the certification result information, the security module 30 decrypts the information with the encryption key (step S9), and determines whether the game execution is permitted or not (step S10). When the certification result information is the encrypted permission information, the decrypted permission information is obtained by the decryption process of the step S9. Thus, the security module 30 permits the execution of the game to the game system 20 to have the game executed (step S11). On the other hand, when the certification result information is the dummy data, the decryption in the step S9 cannot be executed correctly. Consequently, the security module 30 determines that the game execution is not permitted, so the security module 30 does not permit the execution of the game to the game system 20 (step S12).

As described above, by communicating the encrypted certification information and the encrypted permission information encrypted by using the encryption key, the user certification is executed. Every time the game server 60 receives the request of the user certification from the security module 30, the game server 60 produces the new encryption key and transmits it to the security module 30. Therefore, the permission information generated in the step S6 is always encrypted with the new encryption key. So the security module 30 can obtain the permission information which enables the game apparatus 16 to execute the game, only for the properly registered user having the new encryption key.

The security module 30 uses the encryption key received from the game server 60 only once, and never uses it again. This will be realized in some ways, e.g., by producing the program to use only the encryption key received from the game server 60 in the step S3 whenever the user certification request is executed, or by erasing the encryption key which is once used during the decryption process in the step S9.

The above method can prevent the unfair certification process, described above, using the dummy server. For example, it is assumed that a certain user transmits the certification result information transmitted from the game server 60 in the past as the false certification result information from the prepared dummy server to the security module 30 after the user cannot properly execute the game due to the expiry of the program, for example. The security module 30 decrypts the certification result information in the step S9. However, the encryption key which can correctly decrypt the certification result information has already been used in the past. Since the security module 30 can use the encryption key only once, the security module 30 never issues the game execution permission based on the false certification result information. Therefore, the unfair certification process which uses the dummy server can be invalidated.

The encryption function is generally an arithmetic process using a specific function, and the encryption key can be the data showing parameters used in the arithmetic process of the function.

(5) Use Expiry Date Management

Next, the use expiry date management will be explained. The use expiry date management is the process for managing the use expiry date for the user who pays the game fee and obtains the right to use the game in advance, and for inhibiting the use of the game after the use expiry date. Such use expiry date management can be executed easily on the side of the game server if the user is obliged to always perform the user certification by accessing the game server 60 before starting the game even after obtaining the right to use the game. However, it is troublesome and uncomfortable for the user to access the game server and perform the certification process whenever the user starts the game even though it is within the proper use period. Also, a communication cost is needed to access the game server, and the user has to pay the cost. Therefore, it is desirable that the user does not have to access the game server and that the use period is managed only on the side of the game apparatus once the user pays the fee of the game program. In the present invention, this will be realized by the security module 30.

Specifically, use period information is stored in the non-volatile memory 39 in the security module 30 shown in FIG. 3. The use period information can be stored in the form of the date information such as the last date available or in the form of the time information such as total hours available.

The clock function 33 inside the security module 30 is configured not to be adjusted from outside. Thus, it is impossible for the user to adjust and change the time by accessing the clock function 33 in the security module 30. Though the clock function is conventionally integrated in the game apparatus 16, such a clock function is formed to be easily alterable by the user. So, if the use expiry date is managed by utilizing the clock function in the game apparatus 16, an unfair time-change may be performed easily by the user. In this point, according to the security module 30 of the present invention, the use expiry date can be managed correctly because it is impossible to change the integrated clock function 33 from outside.

Figure 5:
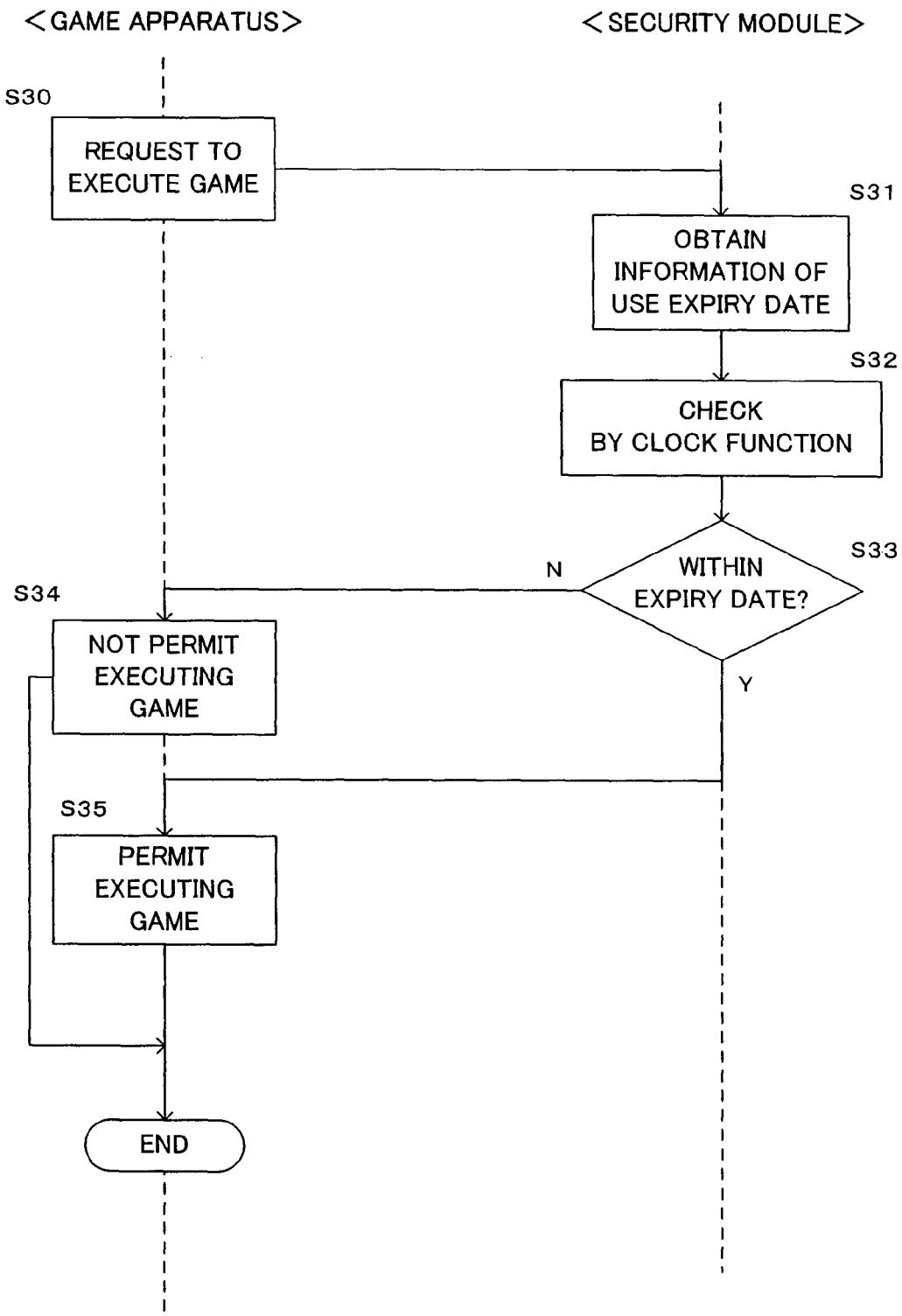
FIG. 5 is a flow chart of a managing process of a use expiry date according to an embodiment of the present invention.

An example of a use period managing process will be described with reference to FIG. 5. FIG. 5 is the flow chart of the use period managing process. To begin with, when the user operates the game apparatus 16 in order to execute a certain game, the game apparatus 16 transmits the game executing request to the security module 30 (step S30). On receiving the game executing request, firstly the security module 30 obtains the use expiry date information from the non-volatile memory 39 (step S31), and then determines whether it is before the use expiry date or not by using the clock function 33 (step S32).

When it is after the time expiry date (step S33; No), the security module 30 does not permit the game execution to the game apparatus 16 (step S34). On the contrary, when it is before the use expiry date (step S33; Yes), the security module 30 gives the game execution permission to the game apparatus 16. Therefore, the user can play the game.

While the example of the use expiry date management executed by the date and time information is described above, the use expiry date management according to the present invention is not limited to the management by such date and time information. For example, the use expiry date can be managed by being set as the times of use and by counting the times of use with a counter function set in the security module 30. In an environment in which the user can selectively play multiple games, when the user plays a certain game, the number of the points corresponding to the game can be subtracted from the number of the points stored in the security module 30, in which the number of available points is stored in advance. The number of the points in this case implies prepaid-type electronic money for playing the game. When the counter function is set in the security module 30 as described above, the counter function should be formed so that adjustment and a reset determination of a count value cannot be performed from outside, like the aforementioned clock function.

(6) Modification

Figure 6:
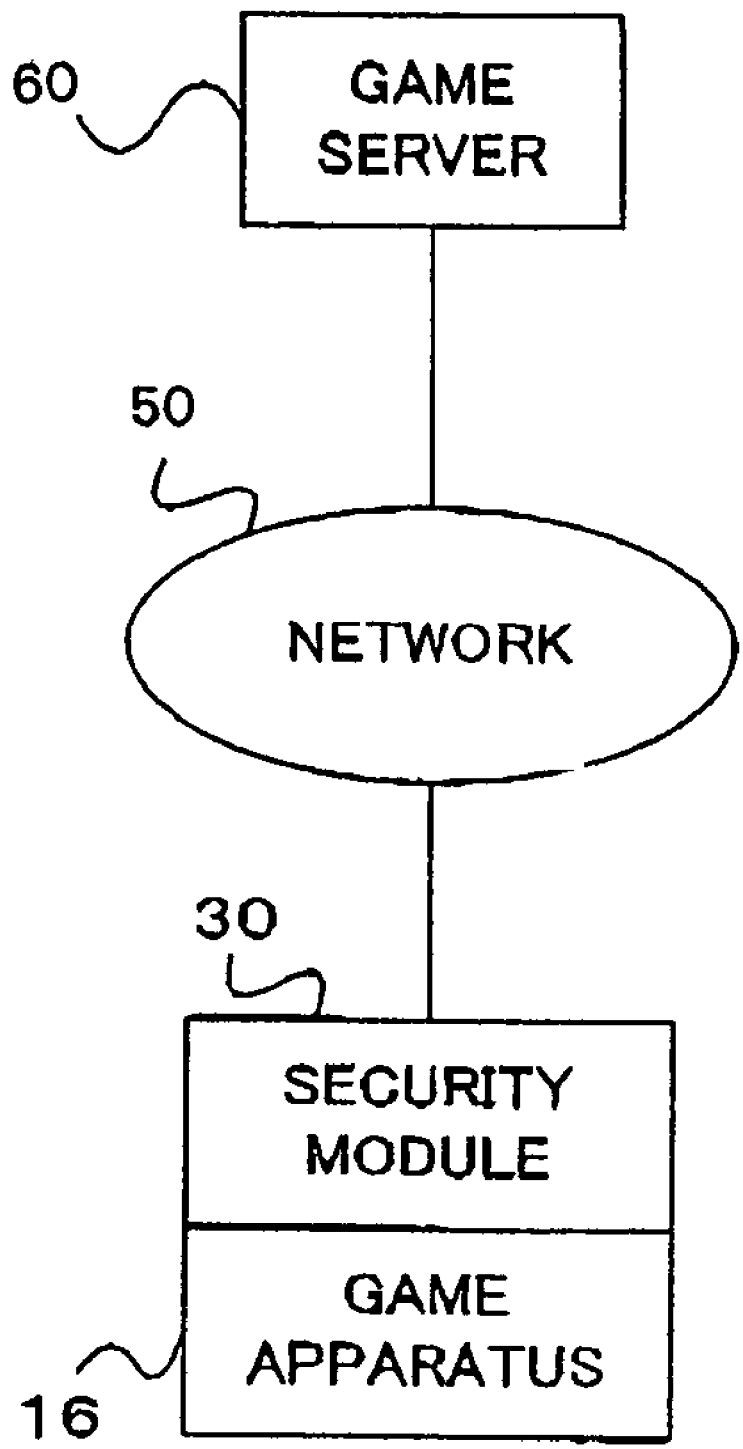
FIG. 6 is a block diagram showing a configuration of a game apparatus and a security module according to another embodiment of the present invention.

In the above embodiment, the security module 30 is connected to the game apparatus 16, and the data communication between the security module 30 and the game server 60 passes through the inside of the game apparatus 16. Instead, as shown in FIG. 6, the security module 30 can be formed so that the data is supplied to the game apparatus 16 through the inside of the security module 30, which is connected with the network 50. In that case, the data which is an object of the user certification by the security module 30 is transmitted to the game apparatus 16 after the process by the security module 30. On the other hand, the data other than the object of the process in the security module 30, such as the downloaded data of a free game program, passes through the inside of the security module 30 as it is to be transmitted to the game apparatus 16.

As shown in FIG. 3, the security module 30 includes the I/F unit 30a, the processing unit 30b and the storing unit 30c. The security module 30 can be formed to have those three units as an integrated unit. Also, only the storing unit 30c can be formed to be removable from the other units, like a card-type storage medium, for example. There is an advantage below. When the three units are formed as an integrated unit, all of the three units have to be exchanged as a whole when a portion in one of the I/F unit 30a and the processing unit 30b is broken. Besides, when the process by the security module 30 becomes multifunctional, the whole security module 30 has to be exchanged as well. However, the storing unit 30c is the unit which stores information such as the certification information and the game use expiry date information of the user. So, if the whole security module 30 including those information is exchanged, it will be impossible to use the information which is stored in the storage unit 30c such as the certification information and the game use expiry date information. From this point of view, if only the storage unit 30c is formed to be removable, the certification information in the storing unit 30c can be taken over as it is, even when the other units have to be exchanged due to the above described reasons.

As described above, according to the present invention, the user can play the game safely and comfortably in the network game, with high security and without complicated work.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2002-272794 filed on Sep. 19, 2002 and No. 2002-356515 filed on Dec. 9, 2002 including the specification, claims, drawings and summary is incorporated herein by reference in their entirety.

What is claimed is:

1. A certification processing hardware connected to a terminal device capable of communicating with a server device via a network and executing user certification processing of a user of the terminal device by communicating with the server device, the certification processing hardware comprising:
    a storing unit which stores certification information of the user;
    an encryption key receiving unit which requests a certification process from the server device and receives an encryption key assigned to the certification process hardware from the server device;
    an encryption processing unit which encrypts the certification information by using the received encryption key;
    a certification information transmitting unit which transmits the encrypted certification information to the server device;
    a certification result information receiving unit which receives encrypted certification result information from the server device;
    a decryption processing unit which decrypts the encrypted certification result information by using the encryption key, wherein the decryption processing unit executes a decryption process by using one encryption key only once; and
    an execution instructing unit which gives an execution instruction for a process comprising communication from the server device to the terminal device when a decryption of the certification result information by the decryption processing unit succeeds.

2. A certification processing hardware connected to a terminal device capable of communicating with a server device via a network and executing user certification processing of a user of the terminal device by communicating with the server device, the certification processing hardware comprising:
    a storing unit which stores certification information of the user;
    an encryption key receiving unit which requests a certification process from the server device and receives an encryption key assigned to the certification process hardware from the server device;
    an encryption processing unit which encrypts the certification information by using the received encryption key;
    a certification information transmitting unit which transmits the encrypted certification information to the server device;

a certification result information receiving unit which receives encrypted certification result information from the server device;

a decryption processing unit which decrypts the encrypted certification result information by using the encryption key;

an execution instructing unit which gives an execution instruction for a process comprising communication from the server device to the terminal device when a decryption of the certification result information by the decryption processing unit succeeds; and a controller which controls the terminal device based on the decrypted certification result information.

3. A certification processing system comprising:

a server device and a terminal device which can communicate with each other via a network, and hardware which is connected to the terminal device and executes a user certification process in the terminal device by communicating with the server device, wherein the server device comprises:

an encryption key transmitting unit which transmits an encryption key assigned to the hardware which is making a certification request in response to the certification request from the hardware; and a certification result information transmitting unit which receives and decrypts encrypted certification information from the hardware and encrypts certification result information to transmit an encrypted certification result information to the hardware, and wherein the hardware comprises:

a storing unit which stores certification information of the user;

an encryption key receiving unit which sends the certification request to the server device and receives the encryption key from the server device;

an encryption processing unit which encrypts the certification information by utilizing the received encryption key;

a certification information transmitting unit which transmits the encrypted certification information to the sewer device;

a certification result information receiving unit which receives the encrypted certification result information from the server device;

a decryption processing unit which decrypts the encrypted certification result information by using the encryption key, wherein the decryption processing unit executes a decryption process by using one encryption key only once; and an execution instructing unit which gives execution instruction of a process comprising communication from the server device to the terminal device when decryption of the certification result information by the decryption processing unit succeeds, and wherein the terminal device comprises:

an instruction requesting unit which requests the execution instruction of the process comprising the communication from the server device to the hardware; and an executing unit which executes the process after receiving the execution instruction from the hardware.

4. A method for performing user certification processing for a user of a terminal device communicating with a server device via a network, the method comprising the steps of:

connecting certification processing hardware to the terminal device;

storing certification information of the user in the certification processing hardware;

requesting a certification process from the server device;

receiving, from the server device, an encryption key assigned to the certification processing hardware;

encrypting the certification information by using the received encryption key;

transmitting the encrypted certification information to the server device;

receiving encrypted certification result information from the server device;

decrypting the encrypted certification result information by using the encryption key, wherein the decrypting step is executed by using one encryption key only once; and giving an execution instruction of a process comprising communication from the server device to the terminal device after the decrypting step.

5. A method for performing user certification processing for a user of a terminal device communicating with a server device via a network, the method comprising the steps of:

connecting certification processing hardware to the terminal device;

storing certification information of the user in the certification processing hardware;

requesting a certification process from the server device;

receiving, from the server device, an encryption key assigned to the certification processing hardware;

encrypting the certification information by using the received encryption key;

transmitting the encrypted certification information to the server device;

receiving encrypted certification result information from the server device;

decrypting the encrypted certification result information by using the encryption key;

giving an execution instruction of a process comprising communication from the server device to the terminal device after the decrypting step; and controlling the terminal device based on the decrypted certification result information.

6. A method for performing user certification processing for a user of a terminal device communicating with a server device via a network, the method comprising the steps of:

connecting certification processing hardware to the terminal device;

storing certification information of the user in the certification processing hardware;

sending a certification request from the certification processing hardware to the server device;

transmitting from the server device an encryption key assigned to the certification processing hardware in response to the certification request; and encrypting the certification information by utilizing the received encryption key;

transmitting the encrypted certification information to the server device;

receiving encrypted certification information from the certification processing hardware;

decrypting the encrypted certification information;

encrypting certification result information;

transmitting the encrypted certification result information to the certification processing hardware;

receiving the encrypted certification result information from the server device;

decrypting the encrypted certification result information by using the encryption key, wherein the decrypting step is executed by using one encryption key only once; and giving execution instruction of a process comprising communication from the server device to the terminal device after the decrypting the encrypted certification result information step; and executing the process after receiving the execution instruction from the hardware.

7. A certification processing system comprising:

a sewer device and a terminal device which can communicate with each other via a network, and hardware which is connected to the terminal device and executes a user certification process in the terminal device by communicating with the server device, wherein the server device comprises:

an encryption key transmitting unit which transmits an encryption key assigned to the hardware which is making a certification request in response to the certification request from the hardware; and a certification result information transmitting unit which receives and decrypts encrypted certification information from the hardware and encrypts certification result information to transmit an encrypted certification result information to the hardware, and wherein the hardware comprises:

a storing unit which stores certification information of the user;

an encryption key receiving unit which sends the certification request to the server device and receives the encryption key from the server device;

an encryption processing unit which encrypts the certification information by utilizing the received encryption key;

a certification information transmitting unit which transmits the encrypted certification information to the server device;

a certification result information receiving unit which receives the encrypted certification result information from the server device;

a decryption processing unit which decrypts the encrypted certification result information by using the encryption key;

a controller which controls the terminal device based on the decrypted certification result information; and an execution instructing unit which gives execution instruction of a process comprising communication from the server device to the terminal device when decryption of the certification result information by the decryption processing unit succeeds, and wherein the terminal device comprises:

an instruction requesting unit which requests the execution instruction of the process comprising the communication from the server device to the hardware; and an executing unit which executes the process after receiving the execution instruction from the hardware.

8. A method for performing user certification processing for a user of a terminal device communicating with a server device via a network, the method comprising the steps of:

connecting certification processing hardware to the terminal device;

storing certification information of the user in the certification processing hardware;

sending a certification request from the certification processing hardware to the server device;

transmitting from the server device an encryption key assigned to the certification processing hardware in response to the certification request; and encrypting the certification information by utilizing the received encryption key;

transmitting the encrypted certification information to the server device;

receiving encrypted certification information from the certification processing hardware;

decrypting the encrypted certification information;

encrypting certification result information;

transmitting the encrypted certification result information to the certification processing hardware;

receiving the encrypted certification result information from the server device;

decrypting the encrypted certification result information by using the encryption key;

giving execution instruction of a process comprising communication from the server device to the terminal device after the decrypting the encrypted certification result information step;

executing the process after receiving the execution instruction from the hardware; and controlling the terminal device based on the decrypted certification result information.

* * * * *